(12) United States Patent
Kawakami et al.

(10) Patent No.: US 11,666,889 B2
(45) Date of Patent: Jun. 6, 2023

(54) INORGANIC OXIDE

(71) Applicant: Sumitomo Chemical Company, Limited, Tokyo (JP)

(72) Inventors: Yoshitaka Kawakami, Ehime (JP); Hiroyuki Ando, Ehime (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 135 days.

(21) Appl. No.: 16/969,339

(22) PCT Filed: Feb. 15, 2019

(86) PCT No.: PCT/JP2019/005714
§ 371 (c)(1),
(2) Date: Aug. 12, 2020

(87) PCT Pub. No.: WO2019/160124
PCT Pub. Date: Aug. 22, 2019

(65) Prior Publication Data
US 2021/0046454 A1    Feb. 18, 2021

(30) Foreign Application Priority Data

Feb. 15, 2018  (JP) ............................ JP2018-025198

(51) Int. Cl.
| | | |
|---|---|---|
| *B01J 21/04* | (2006.01) | |
| *B01J 21/06* | (2006.01) | |
| *B01J 23/10* | (2006.01) | |
| *B01J 37/04* | (2006.01) | |
| *B01J 37/08* | (2006.01) | |
| *B01D 53/94* | (2006.01) | |
| *B01J 23/46* | (2006.01) | |
| *C01G 25/00* | (2006.01) | |
| *F01N 3/28* | (2006.01) | |
| *F01N 3/10* | (2006.01) | |

(52) U.S. Cl.
CPC ............ *B01J 23/10* (2013.01); *B01D 53/945* (2013.01); *B01J 23/464* (2013.01); *C01G 25/006* (2013.01); *F01N 3/2803* (2013.01); *B01D 2255/1025* (2013.01); *C01P 2002/50* (2013.01); *F01N 3/101* (2013.01); *F01N 2330/02* (2013.01); *F01N 2330/30* (2013.01); *F01N 2370/02* (2013.01)

(58) Field of Classification Search
CPC .......... B01J 21/04; B01J 21/066; B01J 23/10; B01J 37/04; B01J 37/08
USPC ................ 502/302–304, 349, 355, 415, 439
See application file for complete search history.

(56) References Cited

U.S. PATENT DOCUMENTS

| | | | | |
|---|---|---|---|---|
| 4,927,799 | A * | 5/1990 | Matsumoto ............... | B01J 23/83 502/303 |
| 5,039,647 | A * | 8/1991 | Ihara .................... | B01D 53/945 502/332 |
| 5,075,276 | A * | 12/1991 | Ozawa .................... | B01J 23/63 502/302 |
| 5,260,249 | A * | 11/1993 | Shiraishi .............. | B01D 53/945 423/213.5 |
| 5,284,694 | A * | 2/1994 | Lockridge ................ | B32B 3/28 525/70 |
| 5,326,519 | A * | 7/1994 | Claussen ............... | C04B 35/651 264/650 |
| 5,439,865 | A | 8/1995 | Abe et al. | |
| 5,455,019 | A | 10/1995 | Inui et al. | |
| 5,883,037 | A * | 3/1999 | Chopin ..................... | B01J 23/83 502/355 |
| 6,150,288 | A * | 11/2000 | Suzuki ................. | B01J 37/0236 502/313 |
| 6,180,075 | B1 * | 1/2001 | Lindner ............... | B01J 23/8946 423/213.2 |
| 6,181,572 | B1 * | 1/2001 | Lutz, Jr. ................. | H04Q 1/028 361/728 |
| 6,306,794 | B1 * | 10/2001 | Suzuki ................. | B01J 37/0236 502/313 |
| 6,326,329 | B1 * | 12/2001 | Nunan ...................... | B01J 23/10 502/263 |
| 6,464,946 | B1 * | 10/2002 | Yamada ............... | B01D 53/945 422/177 |
| 6,602,479 | B2 * | 8/2003 | Taniguchi ............ | B01D 53/945 423/239.1 |
| 6,762,147 | B2 * | 7/2004 | Morikawa ............ | B01J 37/0054 502/355 |
| 6,797,668 | B2 * | 9/2004 | Yoshikawa .............. | B01J 23/10 502/328 |
| 7,939,041 | B2 * | 5/2011 | Darab .................... | B01J 23/002 502/355 |
| 2009/0023581 | A1 * | 1/2009 | Di Monte ................. | C01F 7/02 502/355 |
| 2011/0183840 | A1 * | 7/2011 | Darab ................. | B01J 23/002 502/227 |
| 2012/0129690 | A1 * | 5/2012 | Larcher .................... | B01J 23/38 502/349 |
| 2012/0172212 | A1 * | 7/2012 | Yue ........................ | B01J 35/109 502/439 |

(Continued)

FOREIGN PATENT DOCUMENTS

| | | |
|---|---|---|
| CN | 101385969 A | 3/2009 |
| CN | 103458997 A | 12/2013 |

(Continued)

*Primary Examiner* — Cam N. Nguyen
(74) *Attorney, Agent, or Firm* — Foley & Lardner LLP

(57) ABSTRACT

Provided is a powder inorganic oxide containing Al, Ce and Zr as constituent elements, that affords a molded product with a density of 1.0 to 1.3 g/ml by placing 4.0 g of the inorganic oxide in a cylindrical container having diameter 20 mm and performing uniaxial molding under conditions of room temperature and pressure of 29.4 MPa for 30 sec., and achieves an average shrinkage percentage of not more than 14.0% as calculated by the following formula: average shrinkage percentage (%)=100×{(1−(c)/(a))+(1−(d)/(b))}/2 wherein each symbol is as defined in the DESCRIPTION.

8 Claims, No Drawings

(56) References Cited

U.S. PATENT DOCUMENTS

| | | | |
|---|---|---|---|
| 2013/0017947 A1 | 1/2013 | Schermanz et al. | |
| 2013/0336864 A1* | 12/2013 | Zheng | B01J 35/1042 |
| | | | 502/415 |
| 2013/0345049 A1 | 12/2013 | Chinzei | |
| 2014/0113807 A1 | 4/2014 | Segawa | |
| 2014/0141967 A1* | 5/2014 | Schermanz | C01G 25/02 |
| | | | 502/304 |
| 2014/0336043 A1* | 11/2014 | Rohart | C01F 17/241 |
| | | | 502/250 |

FOREIGN PATENT DOCUMENTS

| | | |
|---|---|---|
| CN | 103706370 A | 4/2014 |
| EP | 2 604 337 A1 | 6/2013 |
| JP | 10-202102 A | 8/1998 |
| WO | WO-2012/120349 A1 | 9/2012 |
| WO | WO-2012/176605 A1 | 12/2012 |

\* cited by examiner

INORGANIC OXIDE

CROSS-REFERENCE TO RELATED APPLICATIONS

This application is the U.S. National Stage of PCT/JP2019/005714, filed Feb. 15, 2019, which claims priority to JP 2018-025198, filed Feb. 15, 2018.

TECHNICAL FIELD

The present invention relates to an inorganic oxide useful for supporting a catalyst metal.

BACKGROUND ART

Catalysts for purifying exhaust gas of automobile (three-way catalyst) are generally composed of a honeycomb substrate (e.g., substrate having a honeycomb structure made of heat-resistant ceramics such as cordierite), a catalyst-supporting layer on the substrate, and a catalyst metal (e.g., noble metals such as Rh, Pd and Pt) supported on the catalyst-supporting layer.

The three-way catalysts purify exhaust gas by oxidizing hydrocarbon and carbon monoxide in the exhaust gas and reducing nitrogen oxide. To promote purification, it is known that a catalyst-supporting layer is famed using inorganic oxide containing Al, Ce and Zr as constituent elements and having oxygen storage capacity (OSC) that stores oxygen under an oxidizing atmosphere and releases oxygen under a reducing atmosphere (hereinafter sometimes to be described as "Al—Ce—Zr oxide") (e.g., patent document 1).

CITATION LIST

Patent Literature

[PTL 1]
JP-A-10-202102

SUMMARY OF INVENTION

Problems to be Solved by the Invention

Exhaust gas purified by three-way catalysts have high temperature. Thus, when the heat resistance of Al—Ce—Zr oxide forming the catalyst-supporting layer is low, the oxide is sintered during the exhaust gas purification. As a result, a problem occurs that the catalyst metal supported by the oxide also moves and agglomerates and the catalyst performance is degraded. Therefore, Al—Ce—Zr oxide is required to have superior heat resistance. The present invention has been made in view of such situation, and an object thereof is to provide an Al—Ce—Zr oxide which is excellent in heat resistance and is capable of producing a catalyst whose performance degradation is suppressed even when exposed to a high temperature.

Means of Solving the Problems

The present invention achieving the above-mentioned object is as described below.
[1] A powder inorganic oxide comprising Al, Ce and Zr as constituent elements,
that affords a molded product with a density of 1.0 to 1.3 g/ml by placing 4.0 g of the inorganic oxide in a cylindrical container having diameter 20 mm and performing uniaxial molding under conditions of room temperature and pressure of 29.4 MPa for 30 sec., and achieves an average shrinkage percentage of not more than 14.0% as calculated by the following formula: average shrinkage percentage (%)=100×{(1−(c)/(a))+(1−(d)/(b))}/2,
wherein (a) and (b) respectively represent a diameter and a height of the molded product, and (c) and (d) respectively represent a diameter and a height of a calcined product obtained by heating the molded product from room temperature to 1300° C. under an air atmosphere at a temperature-rising rate of 200° C./hr., maintaining the product at 1300° C. for 2 hr., and lowering the temperature thereof from 1300° C. to room temperature at a temperature-decreasing rate of 200° C./hr.
[2] The inorganic oxide of [1], wherein the density is not less than 1.1 g/ml.
[3] The inorganic oxide of [1] or [2], wherein the density is not more than 1.2 g/ml.
[4] The inorganic oxide of any one of [1] to [3], wherein the average shrinkage percentage is not more than 13.5%.
[5] The inorganic oxide of any one of [1] to [3], wherein the average shrinkage percentage is not more than 13%.
[6] The inorganic oxide of any one of [1] to [5], wherein a content of Al in the inorganic oxide is 20 to 80 wt. % in tams of $Al_2O_3$.
[7] The inorganic oxide of any one of [1] to [5], wherein a content of Al in the inorganic oxide is 30 to 75 wt. % in tams of $Al_2O_3$.
[8] The inorganic oxide of any one of [1] to [5], wherein a content of Al in the inorganic oxide is 40 to 65 wt. % in tams of $Al_2O_3$.
[9] The inorganic oxide of any one of [1] to [8], wherein a content of Ce in the inorganic oxide is 10 to 40 wt. % in tams of $CeO_2$.
[10] The inorganic oxide of any one of [1] to [8], wherein a content of Ce in the inorganic oxide is 15 to 35% in tams of $CeO_2$.
[11] The inorganic oxide of any one of [1] to [8], wherein a content of Ce in the inorganic oxide is 20 to 30 wt. % in tams of $CeO_2$.
[12] The inorganic oxide of any one of [1] to [11], wherein a content of Zr in the inorganic oxide is 5 to 40 wt. % in tams of $ZrO_2$.
[13] The inorganic oxide of any one of [1] to [11], wherein a content of Zr in the inorganic oxide is 8 to 35 wt. % in tams of $ZrO_2$.
[14] The inorganic oxide of any one of [1] to [11], wherein a content of Zr in the inorganic oxide is 10 to 30 wt. % in tams of $ZrO_2$.
[15] The inorganic oxide of any one of [1] to [14], further comprising La as the constituent element.
[16] The inorganic oxide of [15], wherein a content of La in the inorganic oxide is 0.5 to 5 wt. % in tams of $La_2O_3$.
[17] The inorganic oxide of [15], wherein a content of La in the inorganic oxide is 0.7 to 4 wt. % in tams of $La_2O_3$.
[18] The inorganic oxide of [15], wherein a content of La in the inorganic oxide is 1.0 to 3 wt. % in tams of $La_2O_3$.

Effect of the Invention

The inorganic oxide of the present invention is superior in heat resistance. Using this for supporting a catalyst metal, a catalyst (particularly, three-way catalyst) that suppresses performance degradation even when exposed to a high temperature can be obtained.

DESCRIPTION OF EMBODIMENTS

The present invention is described below. The below-mentioned examples, preferable description and the like can be combined as long as they are not inconsistent with each other.

The inorganic oxide of the present invention contains Al, Ce and Zr as constituent elements.

The content of Al in the inorganic oxide is preferably 20 to 80 wt. %, more preferably 30 to 75 wt. %, further preferably 40 to 65 wt. %, in tams of $Al_2O_3$ from the aspect of imparting heat resistance. The content of Al in the inorganic oxide in teams of $Al_2O_3$ means the $Al_2O_3$ amount in inorganic oxide, converted from the amount of Al in the inorganic oxide calculated by inductively coupled plasma (ICP) atomic emission spectrophotometry. The $Al_2O_3$ amount is based on the whole inorganic oxide as 100 wt. %. The same applies to the below-mentioned Ce content, Zr content, and the content of a constituent element different from Al, Ce and Zr.

The content of Ce in the inorganic oxide is preferably 10 to 40 wt. %, more preferably 15 to 35 wt. %, further preferably 20 to 30 wt. %, in tams of $CeO_2$ to impart oxygen storage capacity (OSC).

The content of Zr in the inorganic oxide is preferably 5 to 40 wt. %, more preferably 8 to 35 wt. %, further preferably 10 to 30 wt. %, in tams of $ZrO_2$ to improve OSC.

The inorganic oxide of the present invention may contain a constituent element different from Al, Ce and Zr (hereinafter sometimes to be described as "different constituent element"). Such different constituent element may be only one kind, or two or more kinds. Examples of the different constituent element include a group 2 element and a rare earth element different from Ce (hereinafter sometimes to be described as "different rare earth element"). The group 2 element and different rare earth element may be only one kind or two or more kinds. Examples of preferable group 2 element include Sr and Ba. Examples of preferable different rare earth element include La. When the different constituent element is contained, the content thereof (when two or more kinds of constituent elements are contained, the total amount thereof) is preferably 0.5 to 5 wt. %, more preferably 0.7 to 4 wt. %, further preferably 1.0 to 3 wt. %, in tams of the oxide of the different constituent element to improve heat resistance.

The inorganic oxide of the present invention preferably further contains La as the constituent element. When La is contained, the content thereof in the inorganic oxide is preferably 0.5 to 5 wt. %, more preferably 0.7 to 4 wt. %, further preferably 1.0 to 3 wt. %, in tams of $La_2O_3$ to improve heat resistance.

One of the characteristics of the powder inorganic oxide of the present invention is that the density of the molded product obtained by placing 4.0 g of the inorganic oxide in a cylindrical container (diameter 20 mm) and performing uniaxial molding under conditions of room temperature and pressure of 29.4 MPa for 30 sec. is 1.0 to 1.3 g/ml. When the density is less than 1.0 g/ml, the amount of the catalyst metal to be supported becomes small and the performance of the obtained catalyst is degraded. On the other hand, when the density is more than 1.3 g/ml, the distance between inorganic oxides becomes short, and inorganic oxide shrinks suddenly at a high temperature. Therefore, the performance of the obtained catalyst markedly decreases at a high temperature. From the aspect of heat resistance, the lower limit of the density is preferably 1.1 g/ml, and the upper limit of the density is preferably 1.2 g/ml.

One of the characteristics of the powder inorganic oxide of the present invention is that it has an average shrinkage percentage of not more than 14.0% as calculated by the following formula: average shrinkage percentage (%)=100× {(1−(c)/(a))+(1−(d)/(b))}/2, wherein (a) and (b) respectively represent a diameter and a height of the molded product, and (c) and (d) respectively represent a diameter and a height of a calcined product obtained by heating the molded product from room temperature to 1300° C. under an air atmosphere at a temperature-rising rate of 200° C./hr., maintaining the product at 1300° C. for 2 hr., and lowering the temperature thereof from 1300° C. to room temperature at a temperature-decreasing rate of 200° C./hr. The inorganic oxide of the present invention showing small shrinkage by calcination at a high temperature is superior in heat resistance. Using this for supporting a catalyst metal, a catalyst (particularly, three-way catalyst) that suppresses performance degradation even when exposed to a high temperature can be obtained. The average shrinkage percentage is preferably not more than 13.5%, more preferably not more than 13%, from the aspect of heat resistance.

The inorganic oxide of the present invention can be produced by a method including the following steps S1-S5:

step S1 including stirring a mixture containing metal aluminum and monovalent alcohol under refluxing to give a mixture containing aluminum alkoxide and monovalent alcohol, step S2 including adding a zirconium compound and a cerium compound to the mixture obtained by step S1, and stirring the obtained mixture under refluxing to give a mixture containing aluminum alkoxide, monovalent alcohol, the zirconium compound and the cerium compound, step S3 including adding water to the mixture obtained by step S2, and stirring the obtained mixture under refluxing to hydrolyze aluminum alkoxide, thus forming aluminum hydroxide to give a mixture containing aluminum hydroxide, step S4 including drying the mixture obtained by step S3 to give a powder containing aluminum hydroxide, and step S5 including calcining the powder obtained by step S4 to give inorganic oxide containing Al, Ce and Zr as constituent elements (hereinafter sometimes to be described as "the production method of the present invention"). Each step is described in order.

(1) Step S1

In step S1, aluminum alkoxide $(Al(OR)_3)$ is obtained by a solid-liquid reaction of metal aluminum (Al) and monovalent alcohol (ROH) as shown by the following formula:

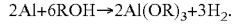

$$2Al+6ROH \rightarrow 2Al(OR)_3+3H_2.$$

While metal aluminum as a material is not particularly limited, highly pure metal aluminum having a content of impurities therein such as iron, silicon, sodium and copper, magnesium of not more than 0.01 wt. % (i.e., purity is not less than 99.99 wt. %) is preferably used. Using such highly pure metal aluminum, the obtained aluminum alkoxide does not require purification. As such highly pure aluminum, a commercially available product can be used.

The shape of metal aluminum is not particularly limited. Examples of the shape include ingot, pellet, foil, wire and powder.

Monovalent alcohol may be only one kind or two or more kinds. From the aspect of the reactivity with metal aluminum, the carbon number of monovalent alcohol is preferably 1 to 8, more preferably 1 to 4. Examples of the monovalent alcohol include methanol, ethanol, n-propyl alcohol, isopropyl alcohol, n-butyl alcohol, sec-butyl alcohol, and tert-butyl alcohol. Among these, ethanol, n-propyl alcohol and isopropyl alcohol are preferable, and isopropyl alcohol is more preferable.

To sufficiently progress the reaction with metal aluminum, it is preferable to use an excess of monovalent alcohol in a stoichiometric ratio to metal aluminum. The mixture containing metal aluminum and monovalent alcohol may be stirred under refluxing for a time period that allows sufficient progress of the reaction thereof.

In step S1, aluminum alkoxide having an alkoxy group corresponding to the monovalent alcohol used is produced. Examples of the obtained aluminum alkoxide include aluminum ethoxide, aluminum n-propoxide, aluminum isopropoxide, aluminum n-butoxide, aluminum sec-butoxide, and aluminum t-butoxide.

The mixture containing aluminum alkoxide and monovalent alcohol obtained by step S1 may be directly used in step S2, or monovalent alcohol may be added to the mixture obtained by step S1 and the obtained diluted mixture may be used in the next step S2.

(2) Step S2

In the production method of the present invention, it is preferable to perform step S2 to give a mixture containing aluminum alkoxide, monovalent alcohol, a zirconium compound and a cerium compound, by adding the zirconium compound and the cerium compound to the mixture obtained by step S1, and stirring the obtained mixture under refluxing. By performing step S2, inorganic oxide wherein Zr is highly dispersed can be obtained. The stirring time under refluxing in step S2 is preferably 0.5 to 24 hr., more preferably 1.0 to 12 hr.

Examples of the zirconium compound used in step S2 include zirconium oxyacetate, zirconium hydroxide, zirconium chloride, zirconium carbonate, zirconium nitrate, zirconium acetate, and zirconium oxalate. The zirconium compound may be an anhydride or a hydrate. The zirconium compound is preferably zirconium oxyacetate. The zirconium compound is preferably used in such an amount that the content of Zr in the obtained inorganic oxide can be within the preferable range.

Examples of the cerium compound used in step S2 include cerium acetate, cerium hydroxide, cerium chloride, cerium carbonate, cerium nitrate, and cerium oxalate. The cerium compound may be an anhydride or a hydrate. The cerium compound is preferably cerium acetate, more preferably cerium acetate monohydrate. The cerium compound is preferably used in such an amount that the content of Ce in the obtained inorganic oxide can be within the preferable range.

A component different from the zirconium compound and cerium compound (hereinafter sometimes to be described as "different component") may be added to the mixture obtained by step S1. Such different component may be only one kind, or two or more kinds. Examples of the different component include a compound containing a group 2 element (preferably Sr or Ba) and a compound containing a different rare earth element (preferably La) (hereinafter sometimes to be described as "different rare earth element compound"). As the different component, the different rare earth element compound is preferable. When the different component is used, the amount thereof is preferably such an amount that the content of a different constituent element derived from the different component can be within the preferable range.

Examples of the compound containing a group 2 element include hydroxide, chloride, carbonate, nitrate, acetate, and oxalate each containing a group 2 element. The compound containing a group 2 element may be only one kind or two or more kinds. The compound containing a group 2 element may be an anhydride or a hydrate. The compound containing a group 2 element is preferably at least one selected from the group consisting of strontium acetate and barium acetate.

Examples of the different rare earth element compound include hydroxide, chloride, carbonate, nitrate, acetate, and oxalate each containing a different rare earth element. The different rare earth element compound may be only one kind or two or more kinds. The different rare earth element compound may be an anhydride or a hydrate. The different rare earth element compound is preferably lanthanum acetate, more preferably lanthanum acetate 1.5-hydrate. The different rare earth element compound is preferably used in an amount that makes the content of the different rare earth element in the obtained inorganic oxide fall within the preferable range.

(3) Step S3

In step S3, water is added to the mixture obtained by step S2, and the obtained mixture is stirred under refluxing to hydrolyze aluminum alkoxide, thus forming aluminum hydroxide to give a mixture containing aluminum hydroxide.

To produce the inorganic oxide of the present invention satisfying the density of the molded product and the average shrinkage percentage, addition of water and stirring under refluxing thereafter need to be performed in two steps. To be specific, a step of adding water to the mixture obtained by step S2 and stirring the obtained mixture under refluxing (hereinafter sometimes to be referred to as "step S31"), and then a step of adding water to the mixture obtained by step S31 and stirring the obtained mixture under refluxing (hereinafter sometimes to be referred to as "step S32") need to be performed. By performing the addition of water and stirring under refluxing thereafter in two steps, topical hydrolysis can be suppressed and aggregation of aluminum hydroxide can be prevented as compared to a case of performing the addition of water and stirring under refluxing thereafter in one step (i.e., a case of using of a large amount of water at one time). As a result, the inorganic oxide of the present invention can be produced.

To prevent topical hydrolysis and the like, the amount of water to be added in step S31 is 1.0 to 2.0 mol, preferably 1.5 to 2.0 mol, per 1 mol of aluminum alkoxide.

In step S31, not only water but also a mixture of water and monovalent alcohol is preferably added to the mixture obtained by step S2. As a result, still more topical hydrolysis can be suppressed. The monovalent alcohol used for preparation of the mixture is preferably the same as the monovalent alcohol used in step S1. When a mixture of water and monovalent alcohol is added, the concentration of water in the mixture is preferably 2.0 to 40 wt. %, more preferably 5.0 to 30 wt. %.

The stirring time under refluxing in step S31 is preferably 0.2 to 24 hr., more preferably 0.4 to 12 hr.

From the aspect of sufficient hydrolysis and drying thereafter, the amount of water to be added in step S32 is 1.0 to 7.0 mol, preferably 1.5 to 3.0 mol, per 1 mol of aluminum alkoxide. A total of the amount of water to be added in step S31 and the amount of water to be added in step S32 is 2.0 to 9.0 mol, preferably 3.0 to 5.0 mol, per 1 mol of aluminum alkoxide. The stirring time under refluxing in step S32 is preferably 0.2 to 24 hr., more preferably 0.4 to 12 hr.

(4) Step S4

In step S4, the mixture obtained by step S3 is dried to give a powder containing aluminum hydroxide. Even if water (or water and monovalent alcohol) remains in the powder obtained by step S4, it is removed by calcination in the next step S5. Thus, it is not necessary to prepare a completely dry powder in step S4.

The drying in step S4 can be performed by heating and/or pressure reduction using a well known means. The drying temperature is preferably 100 to 240° C., more preferably 120 to 200° C., and the drying time is preferably 0.5 to 24 hr., more preferably 1 to 12 hr.

(5) Step S5

In step S5, the powder obtained by step S4 is calcined to give an inorganic oxide containing Al, Ce and Zr as constituent elements.

The calcination temperature is preferably 800 to 1100° C. The holding time at the calcination temperature is preferably 0.5 to 20 hr. The temperature-rising rate from room temperature to the calcination temperature is preferably 30 to 500° C./hr.

Calcination can be performed using, for example, a calcination furnace. Examples of the calcination furnace include electric furnace. The calcination container is preferably made of alumina. The calcination is preferably performed under air atmosphere.

A catalyst can be produced by supporting a catalyst metal by the inorganic oxide of the present invention according to a well-known technique. The catalyst metal is preferably rhodium (Rh). For example, a catalyst in which catalyst metal is supported can be produced by adding the inorganic oxide of the present invention to an aqueous solution of a catalyst metal salt (e.g., rhodium nitrate), maintaining the obtained mixture at a given time, and removing (e.g., evaporating) water. The catalyst metal salt is preferably used such that the supported amount of the catalyst metal in the obtained catalyst is 0.1 to 5.0 wt. % in the whole catalyst. The supported amount of the catalyst metal is more preferably 0.5 to 3.0 wt. %.

A three-way catalyst can be produced using the inorganic oxide of the present invention and according to a well-known technique (e.g., wash coat method). For example, it is possible to produce a three-way catalyst constituted of a honeycomb substrate, a catalyst-supporting layer made of the inorganic oxide of the present invention on the substrate, and a catalyst metal supported by the catalyst-supporting layer, by immersing the honeycomb substrate in an aqueous dispersion containing the catalyst metal salt and the inorganic oxide of the present invention, maintaining the same for a given time, pulling out therefrom and drying the same.

EXAMPLES

The present invention is described in more detail in the following by referring to Examples. The present invention is not limited by the following examples, and appropriate modifications can also be added within the scope compatible with the gist described above and below, all of which are included in the technical scope of the present invention.

Example 1

(1) Step S1

A mixture of highly pure metal aluminum with purity of not less than 99.99 wt. % (manufactured by Sumitomo Chemical Company, Limited) (189 g) and isopropyl alcohol with purity of not less than 99.9 wt. % (manufactured by JXTG Nippon Oil & Energy Corporation) (1389 g) was stirred under refluxing to give a mixture of aluminum isopropoxide (1420 g) and isopropyl alcohol (158 g).

(2) Step S2

To a total amount (aluminum isopropoxide (1420 g) and isopropyl alcohol (158 g)) of the mixture obtained by step S1 were added lanthanum acetate 1.5-hydrate (manufactured by NIKKI CORPORATION) (17 g), zirconium oxyacetate (manufactured by DAIICHI KIGENSO KAGAKU KOGYO CO., LTD.) (225 g) and cerium acetate monohydrate (manufactured by DAIICHI KIGENSO KAGAKU KOGYO CO., LTD.) (335 g) were added to give a mixture. The obtained mixture was stirred under refluxing for 60 min.

(3) Step S3

(a) Step S31

To the mixture obtained by step S2 was added a mixture of water (214 g, amount of water added to 1 mol of aluminum alkoxide: 1.7 mol) and isopropyl alcohol (1928 g) (concentration of water in mixture: 10 wt. %) to give a mixture. The obtained mixture was stirred under refluxing for 30 min.

(b) Step S32

To the mixture obtained by step S31 was added water (290 g, amount of water added to 1 mol of aluminum alkoxide: 2.3 mol) to give a mixture. The obtained mixture was stirred under refluxing for 30 min.

(4) Step S4

The mixture obtained by step S32 was dried by heating at 140° C. for 4 hr. with stirring under a nitrogen atmosphere to give a powder.

(5) Step S5

The powder obtained by step S4 was calcined using an electric furnace under air atmosphere at 1000° C. for 4 hr. (temperature-rising rate from room temperature to 1000° C.: 200° C./hr.) to give a powder of an inorganic oxide containing Ce, Zr, La and Al as constituent elements (Ce content: 26.1 wt. %, Zr content: 18.7 wt. %, La content: 1.2 wt. %, Al content: 54.0 wt. %). The contents show the amounts of oxide (i.e., $CeO_2$, $ZrO_2$, $Al_2O_3$ and $La_2O_3$) converted from the amount of each element (i.e., Ce, Zr, La and Al) obtained from inorganic oxide by ICP atomic emission spectrophotometry. The same applies to the following Comparative Example 1.

Comparative Example 1

According to the method described in patent document 1 (particularly a method similar to Example 1), a powder of an inorganic oxide containing Ce, Zr, La and Al as constituent elements was obtained. To be specific, zirconium oxynitrate (282 g) was dissolved in water (8000 ml) and the mixture was heated to 80° C. with stirring. Thereto was added aluminum isopropoxide (1420 g), nitric acid (60 ml) was further added and stirring was continued. The whole amount of a solution of cerium nitrate 6-hydrate (434 g) and lanthanum nitrate 6-hydrate (22 g) in ethylene glycol (1000 ml) was added and the mixture was stirred at 80° C. for 48 hr. The precipitate obtained by the stirring was dried by a rotary evaporator and further dried in vacuum at 110° C. for 100 hr. The obtained powder was calcined at 950° C. for 4 hr. to give a powder of an inorganic oxide containing Ce, Zr, La and Al as constituent elements (Ce content: 26.1 wt. %, Zr content: 18.7 wt. %, La content: 1.2 wt. %, Al content: 54.0 wt. %).

<Density of Molded Product and Average Shrinkage Percentage>

The inorganic oxide powder (4.0 g) obtained in Example 1 or Comparative Example 1 was placed in a cylindrical container (diameter 20 mm) for uniaxial molding, and uniaxially molded under conditions of room temperature, pressure 29.4 MPa for 30 sec. to give a pellet molded product. The diameter and height of the obtained molded product were measured by an electronic caliper, the volume was calculated, the weight of the molded product was measured by a precision balance, and the density of the molded product was calculated from the obtained values. The results are shown in the following Table.

Then, the obtained molded product was heated under an air atmosphere at a temperature-rising rate of 200° C./hr. from room temperature to 1300° C., maintained at 1300° C. for 2 hr., and lowered at a temperature-decreasing rate of 200° C./hr. from 1300° C. to room temperature to give a calcined product. The diameter and height of the calcined product was measured by an electronic caliper. The results are shown in the following Table.

From the diameter and height of the obtained molded product and the diameter and height of the calcined product, the average shrinkage percentage (%) was calculated by the following formula: average shrinkage percentage (%)=100×{(1−(c)/(a))+(1−(d)/(b))}/2. The results are shown in the following Table.

TABLE 1

| | density of molded product (g/cm³) | (a) (diameter of molded product) (mm) | (c) (diameter of calcined product) (mm) | (b) (height of molded product) (mm) | (d) (height of calcined product) (mm) | average shrinkage percentage (%) |
|---|---|---|---|---|---|---|
| Example 1 | 1.20 | 20.19 | 17.73 | 10.52 | 9.28 | 12.0 |
| Comparative Example 1 | 1.48 | 20.13 | 17.29 | 8.47 | 7.26 | 14.2 |

<Percentage of Void Parts>

Under reduced pressure, one-component epoxy resin was impregnated in the calcined product of the inorganic oxide of Example 1 or Comparative Example 1, and void parts of the calcined product were filled, and then the product was left standing at ordinary temperature for 12 hr. to cured the one-component epoxy resin to prepare a sample. The obtained sample was cut with Ar beam by a cross section polisher (CP) ("SM-09010" manufactured by JEOL). The cut sample was placed in an SEM apparatus ("S-4800" manufactured by Hitachi High-Technologies Corporation), and an SEM image of the section of the sample was taken under conditions of acceleration voltage of 5 kV and magnification of 20000 times. A quantitative analysis software ("TRI/3D-BON-FCS" manufactured by Ratoc System Engineering Co., Ltd.) was used for the obtained SEM image, and the calcined product and the void parts (parts of cured epoxy resin) were distinguished. The percentage of the void parts in 15 analytical areas selected randomly was calculated using 2D label concentration function and the average value thereof was calculated. The percentage (average value) of the obtained void parts is shown in the following Table.

TABLE 2

| | percentage (%) of void parts |
|---|---|
| Example 1 | 51.9 |
| Comparative Example 1 | 41.9 |

As shown in Table 2, the percentage of the void parts in the calcined product of the inorganic oxide of Example 1 was higher than that in Comparative Example 1. From these results, it is found that the inorganic oxide of Example 1 is not easily sintered and is superior in heat resistance as compared to the inorganic oxide of Comparative Example 2.

<Evaluation of Catalyst Performance>
(1) Preparation of Catalyst

A powder (5 g) of the inorganic oxide obtained in Example 1 or Comparative Example 1 was added to an aqueous rhodium chloride solution (25 g) (rhodium concentration: 0.2 wt. %), and the obtained mixture was stirred at room temperature for 2 hr. and dried at 120° C. for 12 hr. to evaporate water, and then the obtained mixture was calcined in air at 600° C. for 3 hr. to prepare a catalyst powder in which Rh was supported. The supported amount of Rh was 1.0 wt. % of the whole catalyst powder.

The obtained catalyst powder (1.0 g) was cast in a cylindrical container (diameter 30 mm) for uniaxial molding and uniaxially molded under conditions of room temperature and pressure of about 20 MPa for 1 min. to give a molded product. The obtained molded product was ground in an agate mortar and the obtained ground product was sieved to prepare a sieved catalyst with a size of 100 to 180 mm.

(2) Aging Treatment

The sieved catalyst obtained in the above-mentioned (1) was filled in a durability test apparatus, and heated at 1000° C. for 10 hr. while alternately flowing rich model gas and lean model gas shown in the following Table for 5 min. each to give a simulatively deteriorated catalyst.

TABLE 3

| | CO | O₂ | CO₂ | H₂O | N₂ |
|---|---|---|---|---|---|
| lean model gas | — | 2% | 10% | 3% | rest |
| rich model gas | 2% | — | 10% | 3% | rest |

(note)
In Table 3, % is based on volume.

(3) Evaluation of Catalyst Performance

The simulatively deteriorated catalyst (60 mg) obtained in the above-mentioned (2) was filled in a quartz reaction tube, and a model gas having the composition shown in the following Table was flown at a space velocity (SV) of 250,000 (time⁻¹), and the gas temperature of the catalyst inlet was raised from room temperature to 600° C. at a temperature-rising rate of 60° C./min. After reaching 600° C. and the mixture was maintained at this temperature for 20 min.

TABLE 4

| Model gas | | | | | | | |
|---|---|---|---|---|---|---|---|
| NO | CO | propylene | O₂ | H₂ | CO₂ | H₂O | N₂ |
| 500 ppm | 0.5% | 400 ppm | 0.5% | 1000 ppm | 14% | 10% | rest |

(note)
In the Table 4, % and ppm are based on volume.

After the gas temperature at the catalyst inlet was maintained at 600° C. for 20 min. as mentioned above, the gas temperature at the catalyst inlet was lowered from 600° C.

to 200° C. at a temperature-decreasing rate of 2.5° C./min. Contents of NO, CO and propylene in the gas before and after passing through the catalyst when the gas temperature at the catalyst inlet was 200° C. or 250° C. were measured by a total hydrocarbon analyzer ("PG-340P" manufactured by HORIBA) and a portable gas analyzer ("FIA-510" manufactured by HORIBA).

From the contents of NO, CO and propylene in the gas before and after passing through the catalyst, purification percentages of NO, CO and propylene were calculated by the following formula: purification percentage (%)=100× (content of each component in gas before passage through catalyst-content of each component in gas after passage through catalyst))/content of each component in gas before passage through catalyst. The results are shown in the following Table.

TABLE 5

| Purification percentages of NO, CO and propylene | | | | | | |
|---|---|---|---|---|---|---|
| | NO | | CO | | propylene | |
| gas temperature (° C.) | 200 | 250 | 200 | 250 | 200 | 250 |
| purification percentage (%) of Example 1 | 23 | 92 | 11 | 99 | 0 | 82 |
| purification percentage (%) of Comparative Example 1 | 5 | 79 | 2 | 73 | 0 | 37 |

As shown in Table 5, the catalyst produced using the inorganic oxide of Example 1 is superior in the performance after aging treatment as compared to the catalyst produced using the inorganic oxide of Comparative Example 1.

INDUSTRIAL APPLICABILITY

The inorganic oxide of the present invention is superior in heat resistance and useful for, for example, supporting a catalyst metal.

This application is based on a patent application No. 2018-025198 filed in Japan, the contents of which are incorporated in full herein.

The invention claimed is:

1. A powder inorganic oxide comprising Al, Ce and Zr as constituent elements,
wherein a molded product, which is produced by placing 4.0 g of the inorganic oxide in a cylindrical container having a diameter of 20 mm and performing uniaxial molding under conditions of room temperature and pressure of 29.4 MPa for 30 sec., has a density of 1.0 to 1.3 g/ml and
wherein an average shrinkage percentage calculated by the following formula is not more than 14.0%:

average shrinkage percentage (%)=100×{(1−(c)/(a))+ (1−(d)/(b))}/2, wherein (a) and (b) respectively represent a diameter and a height of the molded product, and (c) and (d) respectively represent a diameter and a height of a calcined product obtained by heating the molded product from room temperature to 1300° C. under an air atmosphere at a temperature-rising rate of 200° C./hr., maintaining the product at 1300° C. for 2 hr., and lowering the temperature thereof from 1300° C. to room temperature at a temperature-decreasing rate of 200° C./hr.

2. The inorganic oxide according to claim 1, wherein a content of Al in the inorganic oxide is 20 to 80 wt. % in terms of $Al_2O_3$.

3. The inorganic oxide according to claim 1, wherein a content of Ce in the inorganic oxide is 10 to 40 wt. % in terms of $CeO_2$.

4. The inorganic oxide according to claim 1, wherein a content of Zr in the inorganic oxide is 5 to 40 wt. % in terms of $ZrO_2$.

5. The inorganic oxide according to claim 1, further comprising La as the constituent element.

6. The inorganic oxide according to claim 5, wherein a content of La in the inorganic oxide is 0.5 to 5 wt. % in terms of $La_2O_3$.

7. The inorganic oxide according to claim 1, wherein the inorganic oxide is prepared by a process comprising:
stirring a first mixture comprising metal aluminum and a monovalent alcohol under refluxing to provide a second mixture comprising an aluminum alkoxide and the monovalent alcohol,
adding a zirconium compound and a cerium compound to the second mixture to provide a third mixture, and stirring the third mixture under refluxing to provide a fourth mixture comprising the aluminum alkoxide, the monovalent alcohol, the zirconium compound, and the cerium compound,
adding water to the fourth mixture to provide a fifth mixture, and stirring the fifth mixture under refluxing to hydrolyze aluminum alkoxide, thus forming aluminum hydroxide to provide a sixth mixture comprising the aluminum hydroxide,
drying the sixth mixture to produce a first powder comprising the aluminum hydroxide, and
calcining the first powder to produce the powder inorganic oxide of claim 1,
wherein said adding water comprises:
adding water to the fourth mixture to produce a first intermediate mixture and stirring the intermediate mixture under refluxing, and
adding water to the intermediate mixture and subsequent stirring.

8. A process for producing the powder inorganic oxide according to claim 1, the process comprising:
stirring a first mixture comprising metal aluminum and a monovalent alcohol under refluxing to provide a second mixture comprising an aluminum alkoxide and the monovalent alcohol,
adding a zirconium compound and a cerium compound to the second mixture to provide a third mixture, and stirring the third mixture under refluxing to provide a fourth mixture comprising the aluminum alkoxide, the monovalent alcohol, the zirconium compound, and the cerium compound,
adding water to the fourth mixture to provide a fifth mixture, and stirring the fifth mixture under refluxing to hydrolyze the aluminum alkoxide, thus forming aluminum hydroxide to provide a sixth mixture comprising the aluminum hydroxide,
drying the sixth mixture to produce a first powder comprising the aluminum hydroxide, and
calcining the first powder produce a powder inorganic oxide comprising Al, Ce and Zr as constituent elements, wherein said adding water comprises:

adding water to the fourth mixture to produce a first intermediate mixture and stirring the intermediate mixture under refluxing, and adding water to the intermediate mixture and subsequent stirring.

\* \* \* \* \*